April 8, 1941.  G. BROUWER  2,238,011
DEVICE FOR MILLING GAPS IN PISTON RINGS
Filed Jan. 19, 1940  2 Sheets-Sheet 1

Inventor:
George Brouwer
by James R. McKnight
his Atty.

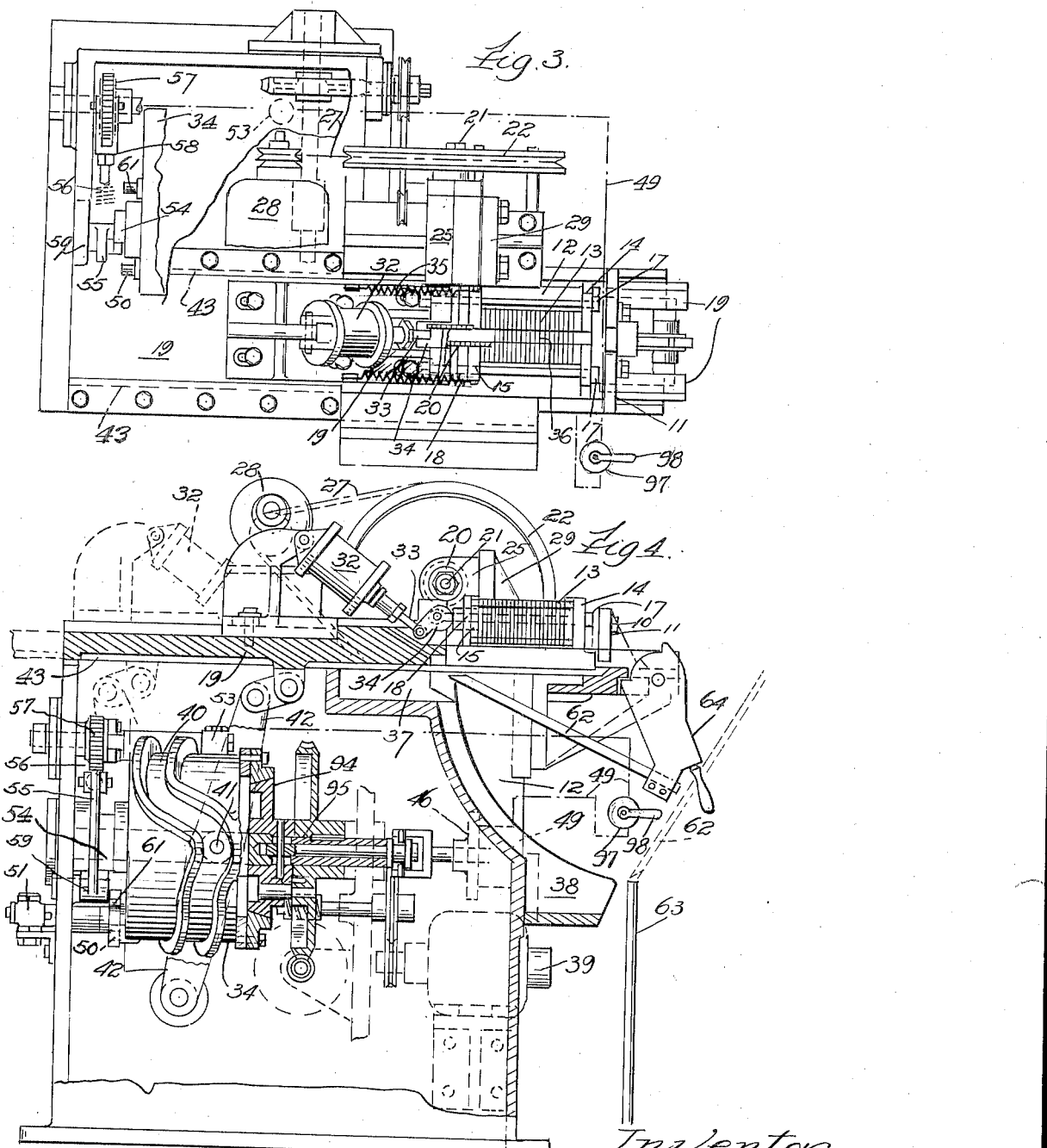

Patented Apr. 8, 1941

2,238,011

UNITED STATES PATENT OFFICE 2,238,011

DEVICE FOR MILLING GAPS IN PISTON RINGS

George Brouwer, Muskegon, Mich., assignor to National Piston Ring Company, Fruitport, Mich., a corporation Application January 19, 1940, Serial No. 314,571

2 Claims. (Cl. 29—70)

My invention relates to a device for milling gaps at one time in a plurality of piston rings.

Among the objects of my invention is to provide a device for angularly cutting gaps in a plurality of piston rings at one time, and such other objects, advantages and capabilities as will later more fully appear and which are inherently possessed by my invention.

While I have shown in the accompanying drawings a preferred form of my invention, yet I desire it understood that the same is susceptible of modification and change without departing from the spirit of my invention.

Figure 1:
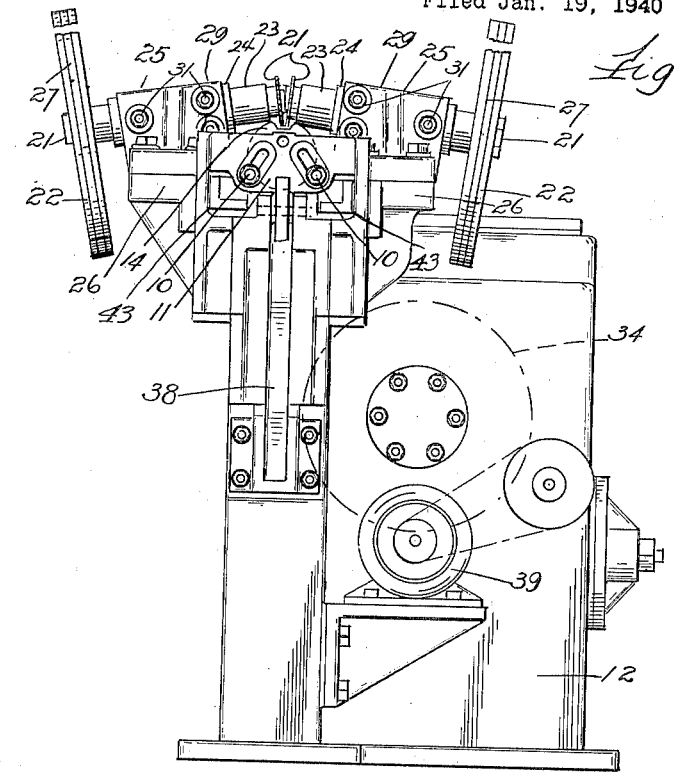
Figure 5:
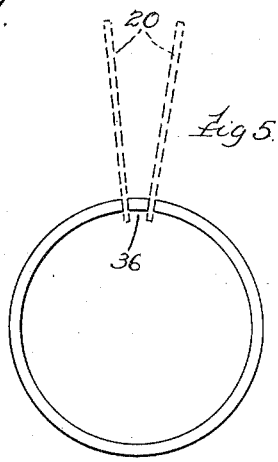
Figure 6:
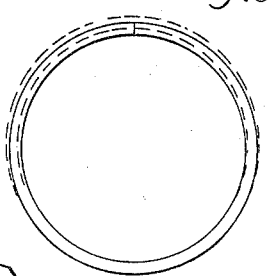
Figure 2:
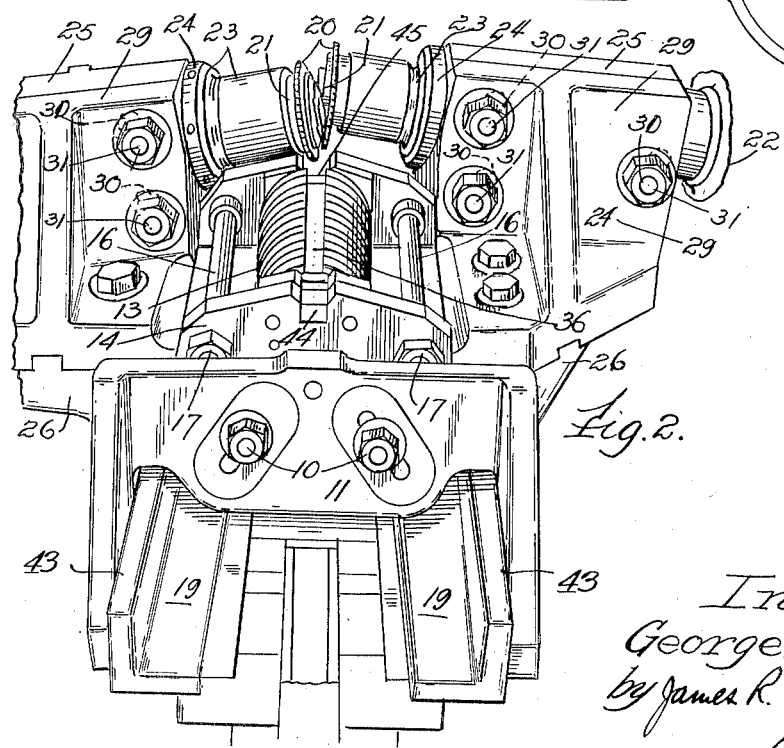

Referring to the drawings, Fig. 1 is a front elevation of my device; Fig. 2 is a perspective view, and Fig. 3 is a top plant view of my device; Fig. 4 is a side elevation of my device with parts broken away showing the interior thereof; Fig. 5 is a detail view showing a ring with the gap being removed; Fig. 6 is a detail view of the ring ready for finish turning.

The embodiment selected to illustrate my invention comprises a pair of spaced locating bars 10 attached to a frame 11 which is attached to a base 12. The locating bars 10 extend rearwardly and are adapted to receive thereon a plurality of rings, which when placed on the bars 10 form a tube 13. The tube 13 is held between a fixed front clamping member 14 and a rear movable clamping member 15. A pair of spaced tie rods 16 extend from the front clamping member 14 to which they are attached by bolts 17 rearwardly through the rear clamping member 15 to a projection 18 of the work slide 19 to which they are attached. A pair of oppositely disposed saws 20 are each angularly mounted on an arbor 21 on the other ends of which is a fly wheel 22. A sleeve or quill 23 surrounds each arbor 21 and is adjustable longitudinally for the spacing of the saws 20. It is locked in desired position by means of a lock nut 24. Each sleeve 23 passes through a head 25 which is mounted to an extension 26 attached to the base 12. The wheels 22 are moved by belts 27 attached to an electrical motor 28 or other source of power.

Each head 25 is adjustable angularly on bracket 29 having a slotted bolt hole 30 to receive stud 31. An air cylinder 32 has a piston rod 33 which engages a cam 34 which bears against the rear portion of the rear clamping member 15 to hold the clamping member 15 against the tube 13. When the air cylinder 32 has released pressure, springs 35, which are attached on one end to the clamping member 15 and on the other end to the work slide 19, return the clamping member 15 to normal released position and permit tube 13 after gap 36 has been cut therein by the saws 20 to be dropped onto a V shaped section 37 of the base 12. The rings then pass downwardly out exit member 38. The air cylinder 32 is operated by mechanically driven valve means which is set as to time for the cutting operation by the cam.

The operation of the work slide 19 is as follows: A cam 34 mounted on the base 12 is operated by a motor 39. The cam 34 has a tortuous side channel or track 40 in which moves a roller 41 attached to an arm 42 which in turn is attached to the work slide 19. The work slide 19 slides on a track 43 formed in the base 12.

In the use of my device the operator takes a plurality of piston ring castings. These ring castings have a locating notch or projection where the gap is to be cut. The rings are lined up on an automatic riffler, bringing all the gap sections in line. The rings are then shoved on to a transfer bar to maintain the location of the projections. The rings are then transferred to the locating bars 10, the transfer bar being located by means of two notched portions 44 and 45 in the front and rear clamping members 14 and 15 respectively. The rings formed into tube 13 are held by the clamping members 14 and 15 upon the operation of air cylinder 32. With the tube 13 thus located into position an air valve actuates the large internal cam located at the base of the machine which moves a lever connected to the work carrier, making the carrier travel through the path of the saws and then returning the work carrier to starting position. However, before returning the work carrier to starting position, after the carrier has travelled through the work path the rotating cam operates a valve which ordinarily releases the air pressure of the rear clamping member so as to release the rings from clamped position. The rings drop through the carrier onto a V block and the work carrier returning to its starting position strips the rings off the V block onto an exit means.

The gap in the rings is formed with an angular saw which is at right angles to the periphery of the rings. This permits a perfect closing of the rings on both the inside and the outside, which would not be true if the cut were a straight cut. Ordinarily in the past there have been several milling operations consisting generally of a primary straight cut and later angular cuts to obtain the proper closure. With my device in a single operation I can provide an angular cut for a plurality of rings which will provide a perfect closure for the rings.

A clutch 94 is mounted on the shaft 95 and is air operated through cylinder 46 in the air line 49. A cam 54 operates lever 55 against stretch spring 56 in connection with a rocker segment 57 through link 58, opening and closing valve 53, through air line 49 to cylinder 46 and shaft 95 to open and close clutch 94. When the clutch 94 is closed a pin 59 which is fastened to the face of the cam 34, and carried by the cam 34 opens a valve 51 operating the clamp cylinder 32 before the saws 20 cut into the tube 13. At the end of the cutting stroke stop or pin 61 engages and shuts off valve 51, releasing the rings.

The rings when released automatically thread themselves on a rod 62 and are transferred manually to a stand rod 63 by raising the lever 64.

When the machine is stopped for loading, a valve 97 is operated manually by handle 98 to operate cylinder 46 to start clutch operation to commence the machine cycle.

Having thus described my invention, I claim:

1. A device for milling gaps in piston rings comprising a base, a work carrier slidably mounted on said base, a fixed clamping member, a movable clamping member, a pair of spaced locater bars extending between said clamping members and adapted to receive a tube formed from a plurality of piston ring castings, means for moving the movable clamping member with relation to the tube, a pair of angularly inclined and oppositely disposed cutting members, said cutting members adjustable to a desired angle and spacing, means for sliding said work carrier with the tube between said cutting members for cutting an angular gap therein, and then releasing said tube from the device.

2. A device for milling gaps in piston rings comprising a base, a work carrier slidably mounted on said base, a pair of spaced locater bars to receive a tube formed of a plurality of piston ring castings, a front fixed clamping member adjacent the front of said locater bars, a movable rear clamping member adjacent the rear of said locater bars, means for moving the rear movable clamping member against the tube for holding the same in fixed position, a pair of arbors having a fly wheel on their outer ends and angularly inclined and oppositely disposed saws on their inner ends, means for spacing the saws, means for adjusting the degree of angular incline of the saws, means for moving the work carrier rearwardly so that the tube passes between said saws and an angular gap is cut therein, means for releasing the rear movable clamping member from contact with said tube, a downwardly extending exit member, and means for moving said cut tube to said exit member so that the rings may fall into said exit member.

GEORGE BROUWER.